(12) United States Patent
Burnett et al.

(10) Patent No.: US 7,782,206 B2
(45) Date of Patent: Aug. 24, 2010

(54) RFID TAG DISABLING SYSTEMS AND METHODS OF USE

(75) Inventors: Matthew K. Burnett, Albuquerque, NM (US); Scott Noakes, Albuquerque, NM (US); Frank Mestas, Albuquerque, NM (US)

(73) Assignee: TC License Ltd., Hummelstown, PA (US)

( * ) Notice: Subject to any disclaimer, the term of this patent is extended or adjusted under 35 U.S.C. 154(b) by 336 days.

(21) Appl. No.: 12/056,574

(22) Filed: Mar. 27, 2008

(65) Prior Publication Data

US 2009/0243858 A1 Oct. 1, 2009

(51) Int. Cl.
*G08B 13/14* (2006.01)

(52) U.S. Cl. .............. 340/572.1; 340/572.3; 340/572.8; 340/933; 343/842

(58) Field of Classification Search .............. 340/572.1, 340/572.3, 572.8, 693.6, 933; 343/842, 375
See application file for complete search history.

(56) References Cited

U.S. PATENT DOCUMENTS

| | | | |
|---|---|---|---|
| 6,104,291 A * | 8/2000 | Beauvillier et al. ...... | 340/572.1 |
| 6,121,880 A | 9/2000 | Scott et al. | |
| 6,127,938 A * | 10/2000 | Friedman .................. | 340/693.6 |
| 6,275,157 B1 | 8/2001 | Mays et al. | |
| 7,224,291 B2 | 5/2007 | Hassett | |
| 7,277,016 B2 | 10/2007 | Moskowitz et al. | |
| 7,301,462 B1 | 11/2007 | Holling et al. | |
| 7,382,275 B2 * | 6/2008 | Feldman et al. ............. | 340/904 |
| 2006/0250250 A1 | 11/2006 | Youn | |

* cited by examiner

*Primary Examiner*—George A Bugg
*Assistant Examiner*—Hongmin Fan
(74) *Attorney, Agent, or Firm*—Caesar, Rivise, Bernstein, Cohen & Pokotilow, Ltd.

(57) ABSTRACT

Systems and methods for disabling transponders used in electronic toll collection or other RFID systems, wherein the transponders include an antenna and RFID circuitry. The transponders can be selectively disabled by releasably securing a disabling device having a metallic portion at an operative position over the antenna of the RFID system, whereupon the metallic portion is coupled to the antenna in such a manner as to disable the RFID circuitry so long as the disabling device is at the operative position. The RFID circuitry is arranged to be automatically enabled upon removal of the disabling device from the operative position.

22 Claims, 2 Drawing Sheets

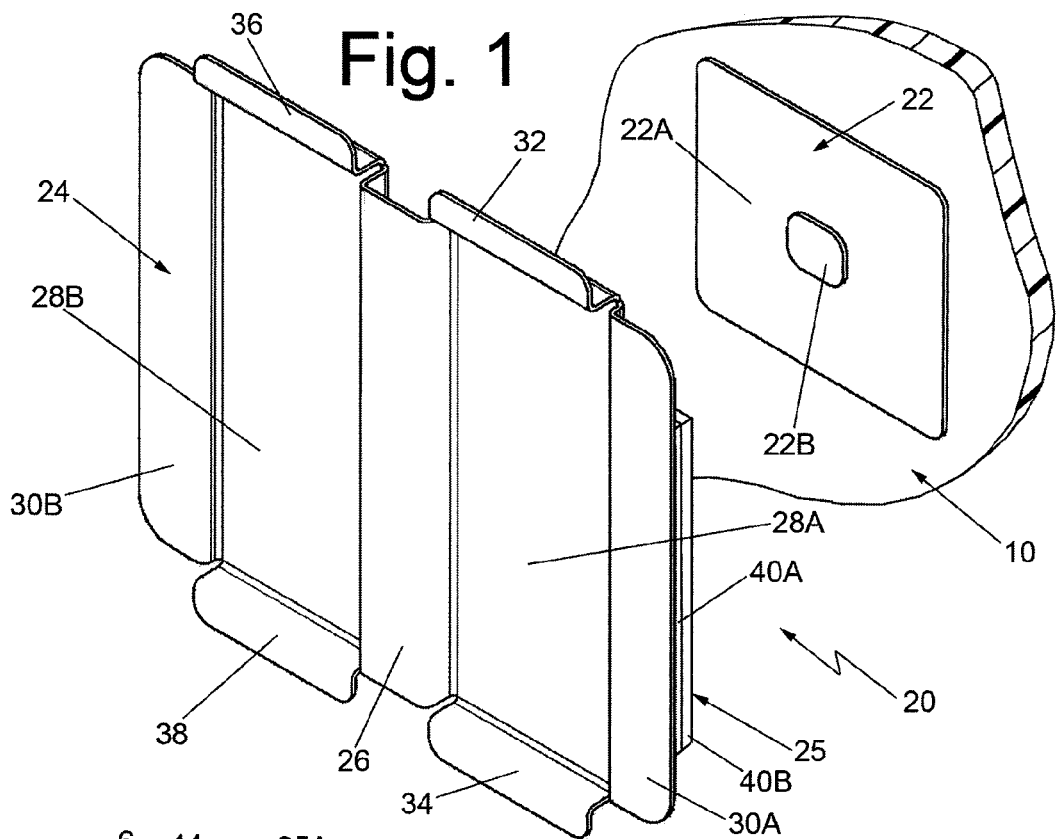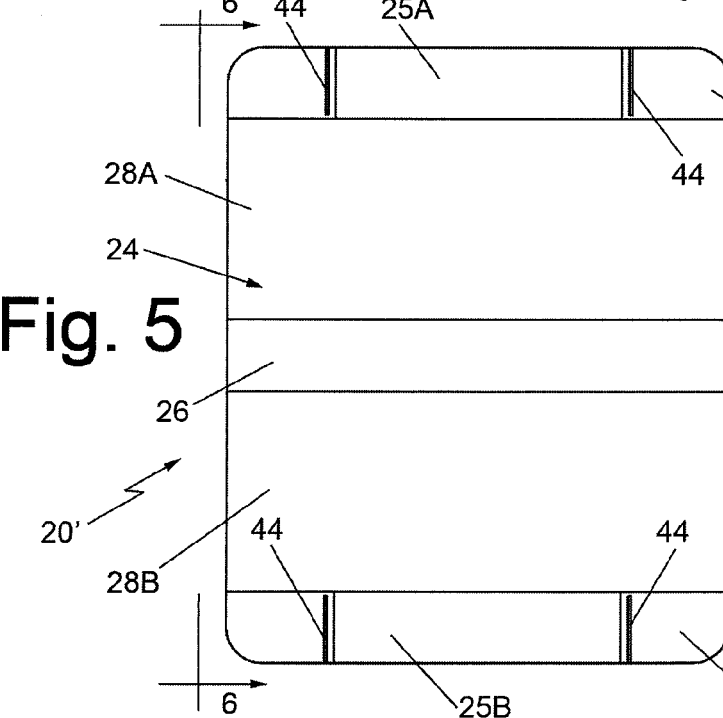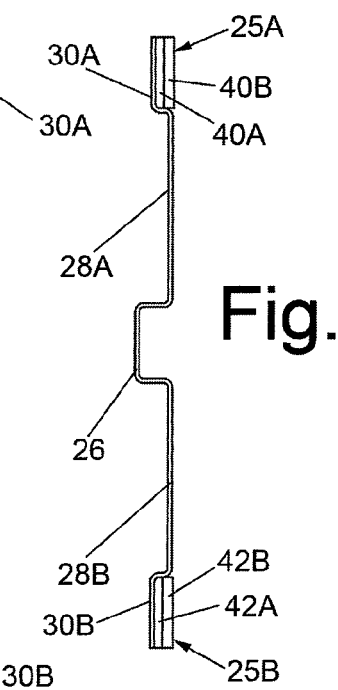

RFID TAG DISABLING SYSTEMS AND METHODS OF USE

CROSS-REFERENCE TO RELATED APPLICATIONS

"Not Applicable"

STATEMENT REGARDING FEDERALLY SPONSORED RESEARCH OR DEVELOPMENT

"Not Applicable"

INCORPORATION-BY-REFERENCE OF MATERIAL SUBMITTED ON A COMPACT DISK

"Not Applicable"

BACKGROUND OF THE INVENTION

This invention relates generally to RFID transponder systems and more particularly for disabling devices and methods of use for selectively disabling RFID transponders when desired.

In response to the inability of conventional toll collection means to meet the demands created by increased highway traffic, automated toll facilities that provide improved toll collection methods and systems have been proposed and are being implemented. These electronic toll collection systems eliminate the manual transactions of conventional toll collection means through the use of radio transmitters and receivers that perform the necessary transactions as a vehicle travels through the automated toll booth. For example, U.S. Pat. No. 7,224,291 (Hassett), which is assigned to the same assignee as this invention, discloses a system for automatic collection of tolls includes an in-vehicle toll processor (e.g., an RFID transponder or tag) having memory for storing a toll-money-available quantity purchased by the user, and a toll-facility-identification site that transmits a toll-facility-identifier signal indicating the identity of the upcoming toll facility. As the vehicle approaches the identification site, the in-vehicle processor receives the identifier signal and calculates the toll to be debited. When the vehicle passes through the toll facility, the in-vehicle processor transmits its identity, its net balance and the toll, which it debits from an account balance. The in-vehicle processor may increment a low balance, in which case it transmits information which is relayed to a central system for billing. Various means for shutting down delinquent in-vehicle components or identifying offender vehicles are described.

In some electronic toll collection applications, it is desirable to disable or temporarily degrade the performance of an RFID tag so that it cannot be read by an interrogating reader. One such situation can occur when more than one RFID tag is mounted in a vehicle windshield, and it is desired to read or write to one tag while preventing any interference from the other. This can occur during RFID system testing, or on actual vehicles that travel interstate highways and are forced to use different tags for various toll roads along the way. Another application is a toll road with high occupancy toll (HOT/HOV) lanes. There may be times where it would be desirable to temporarily disable an RFID tag, such as a windshield sticker tag, such that no toll is paid when traveling through a toll plaza. A person driving in the HOT/HOV lane that had someone else or others in the vehicle with them would be allowed by the toll authority to travel on the toll road without paying tolls. If a person was alone and wanted to drive in the HOT/HOV lane, they too would be allowed, but would have to pay tolls, and therefore would not be allowed to use the tag disabling device.

In the past, RFID tags that were mounted to windshields using hook and loop, or suction cups, or other releasably securable means that allowed easy removal and re-installation of the tags, were disabled by removing them from the windshield and placing them in a metallized bag, pouch or box. For example, the State of New Jersey makes use of "EZPass" RFID tags for its electronic toll collection system. As part of that system the State provides a "silver" (e.g., metallized) "read prevention bag" for users of the EZPass tag. Such users are instructed to insert the tag into the bag for situations where the tag is not to be read at a particular toll plaza. The placement of the tag within that bag will prevent the RFID tag from being read or written to by an interrogating system by shielding the tag from RF energy that the interrogator transmits. In particular, the bag or pouch reflects most or all of this energy, thereby cutting off communication between the tag and the reader. The disadvantage of this type of tag disabling method is that the tag has to be removed from the windshield to accomplish it.

The prior art includes other instances where an RFID transponder can be temporarily shielded so that it cannot be read. For example, Emvelope, Inc. offers a device under the trademark Emvelope® that provides an insert for a wallet or billfold to form a Faraday cage to contain the wireless signals being emitted by RFID chips on cards in the wallet or billfold. Emvelope, Inc. also offers a similar device in the form of a cover for use with passports. Magellan's International also offers a product, which it calls an RFID Passport Wallet, that is arranged to hold and protect passports and credit cards by providing protective shield, so the RF data in the card/passport can only be accessed when the user opens his/her wallet at approved locations.

While the foregoing techniques for temporarily disabling or shielding RFID transponders are generally suitable for their intended purposes for their specific applications, such techniques are not suitable for temporarily disabling RFID transponders that are permanently affixed to a vehicle, e.g., sticker tags bearing RFID transponders secured to the inner surface of the vehicle's windshield or RFID transponders encapsulated in the windshield itself.

Recently, RFID 'sticker' tags have become increasingly popular, e.g., Transcore, Inc. provides such tags. These types of tags are less expensive, easier to use, easier to distribute and have more capability than the previous tags constructed of conventional printed circuit boards and housed in a plastic case. Another advantage is that the 'sticker' tags are designed to be permanently mounted and thus provide more security from fraud by preventing tags to be moved from one vehicle to another. The disadvantage of not being able to move tags between vehicles is offset by the lower cost so that an individual tag can be issued to each vehicle economically. A disadvantage of the permanently mounted 'sticker' tags, however, is that they can't be temporarily disabled. For example, once removed from the windshield, the adhesive on a windshield sticker tag, such as that produced by Transcore, Inc., can be damaged. Since the antenna design in this tag relies on uniform close proximity to the glass for proper operation, the tag cannot be reused. Thus, sticker tags and any other permanently mounted transponder would be read every time it passed within the RF field of an applicable interrogation system, even when the user did not desire to have the RFID tag read, e.g., to disable the tag when it was desired to pay using cash or other means.

RFID tags can be permanently disabled by mechanical destruction of the conductive patterns on the tag. An example is provided in U.S. Pat. No. 7,277,016 (Moskowitz et al.). While permanent tag disabling has certain viable applications, by definition it is unsuitable for applications where the tag is to be disabled only temporarily and so that it can be reused at some later time.

Accordingly a need exists for a device and method to temporarily disable sticker or other permanently mounted tags with the ease and simplicity as has characterized the temporary disablement of hard cased tags (e.g., by removal and placement in a remote location or in a shielding pouch so that the tag could not be read). A need also exists for a device and method for the temporary disablement of a permanently mounted tag to be controlled by the user of the tag without dismounting or damaging the tag. Further still, a need exists for enabling an RFID tag patron to use a permanently mounted RFID transponder, which is more secure than a removable transponder, but still has the flexibility to enable or disable operation of the RFID tag, as necessary.

The subject invention addresses those needs by providing 'sticker' tags and other permanently mounted RFID transducers with this same capability of temporary disablement while retaining all the other positive attributes of a permanently mounted tag/transponder. In particular, the subject invention provides a device for application to (e.g., mounting over) the sticker tag or any other RFID transponder fixedly mounted on the windshield or some other portion of the vehicle for the temporarily disabling the RFID transponder, wherein the disabling device is removable, reusable, and able to be stored within a vehicle without being damaged. In addition, the subject invention enables the patron to maintain privacy if so desired.

BRIEF SUMMARY OF THE INVENTION

A system and method for selectively enabling and disabling an RFID transponder located on a vehicle so that said transponder can be selectively disabled and enabled. The transponder comprises an antenna and RFID circuitry.

In accordance with one aspect of this invention the system comprises the antenna, the RFID circuitry and a disabling device. The antenna forms a portion of the vehicle (e.g., it may be embedded in the windshield of the vehicle) or may be in the form of a tag or sticker fixedly secured to the vehicle, e.g., fixedly secured to the windshield. The disabling device comprises a member having a metallic portion arranged to be releasably secured to the vehicle, e.g., the windshield, at an operative position with respect to the antenna, whereupon the metallic portion of the disabling device is coupled to the antenna in such a manner as to disable the RFID circuitry so long as the disabling device is at the operative position. The RFID circuitry is arranged to be automatically enabled upon removal of the disabling device from the operative position.

Another aspect of this invention is the disabling device itself.

Still another aspect of this invention is a method of selectively disabling a transponder located on a vehicle that is operating in an electronic toll system (e.g., an electronic toll system forming a portion of a roadway that includes a high occupancy vehicle or high occupancy toll (HOV/HOT) lane) or some other system wherein the transponder is arranged to provide a first electrical signal when queried by a transmitter forming a portion of the system. The transponder of the system includes an antenna and RFID circuitry. The method basically entails providing the user of the system with a disabling device comprising a member having a metallic portion. The user releasably secures the disabling device to the windshield at an operative position with respect to the antenna when it is desired that the transponder be disabled (e.g., when the vehicle is utilized in the HOV/HOT lane with at least the minimum number of occupants to meet the HOV/HOT requirements of the entity operating the electronic toll system, so that the account associated with the transponder will not be charged a toll). This action couples the metallic portion of the disabling device to the antenna in such a manner as to disable the RFID circuitry from producing the first electronic signal so long as the disabling device is at the operative position. The RFID circuitry of the system is arranged to be automatically enabled upon removal of the disabling device from the operative position.

Still another aspect of this invention is method of testing plural RFID transponders located on a vehicle, the transponders being arranged for use in an electronic toll system or some other electronic system wherein a vehicle with the RFID transponder is to be interrogated by a reader to determine the vehicle's presence at a certain location. Each of the transponders is arranged to provide a respective first electrical signal when queried by a transmitter forming a portion of the system. Each transponder includes an antenna and RFID circuitry, with the antenna being fixedly secured to the vehicle. The method basically entails providing a tester with at least one disabling device comprising a member having a metallic portion. When it is desired to disable one or more of the transponders, all that the tester has to do is to releasably secure the disabling device to the vehicle at an operative position with respect to the antenna of the particular transponder to be disabled. When the disabling device(s) is/are in its/their operative position(s) the metallic portion of the disabling device is coupled to the associated antenna in such a manner as to disable the associated RFID circuitry from producing the first electronic signal so long as the disabling device is at the operative position. The RFID circuitry of each transponder is arranged to be automatically enabled upon removal of the disabling device from the operative position with respect thereto.

BRIEF DESCRIPTION OF SEVERAL VIEWS OF THE DRAWINGS

The invention will be described in conjunction with the following drawings in which like reference numerals designate like elements and wherein:

FIG. 1 is an exploded isometric view of one exemplary tag disabling device constructed in accordance with this invention and shown ready to be placed in its operative position over a sticker tag located on the inner surface of the windshield of a vehicle;

FIG. 5 is a top plan view of another embodiment of a tag disabling device constructed in accordance with this invention; and FIG. 6 is a side elevation view taken along line 6-6 of FIG. 5.

DETAILED DESCRIPTION OF THE PREFERRED EMBODIMENTS OF THE INVENTION

Figure 2:
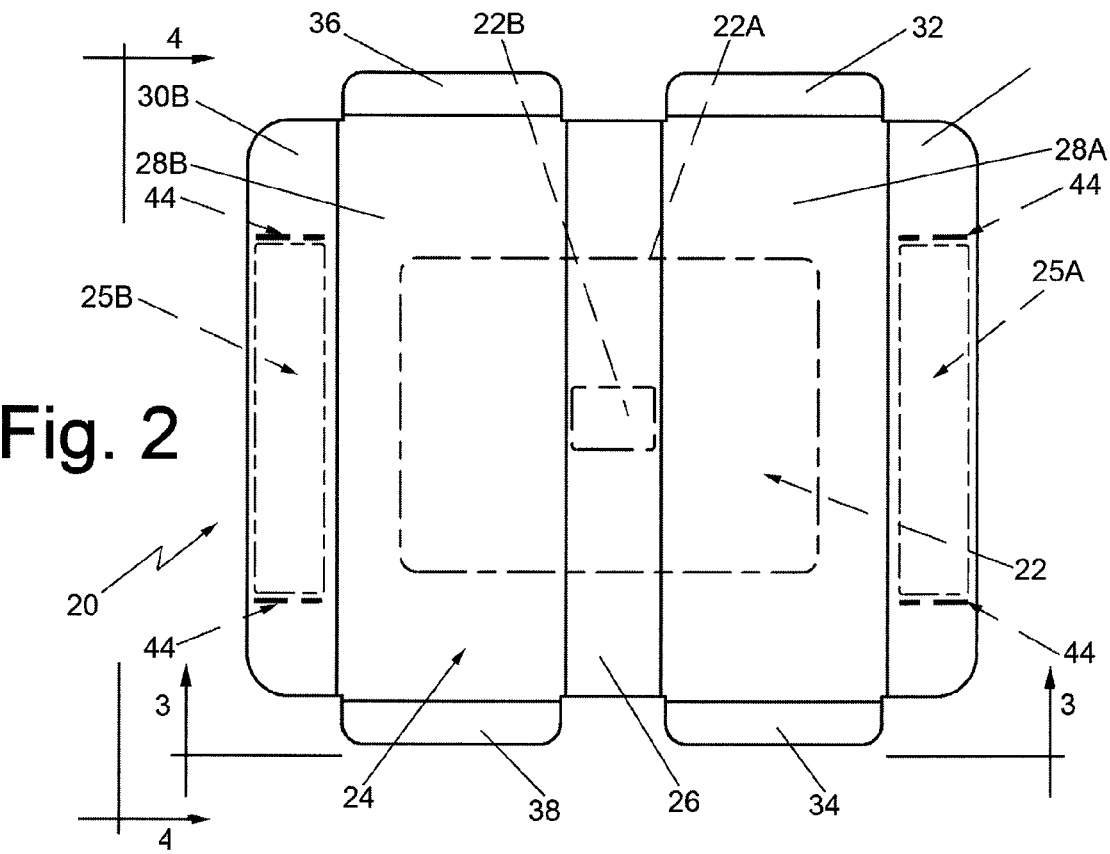
FIG. 2 is a top plan view of the device of FIG. 1 shown in place in its operative position.

Referring now to the drawing wherein like characters refer to like parts, there is shown in FIGS. 1 and 5, exemplary tag disabling devices 20 and 20', respectively, each of which is arranged for selectively disabling an RFID transponder 22 used in an electronic toll system (not shown), an electronic parking system or any other system, such as vehicular access control, traffic monitoring, parking, and the like wherein a vehicle with the RFID tag is to be interrogated by a reader to determine the vehicle's presence at a certain location. The tag disabling devices 20 and 20' are exemplary of a multitude of tag disabling devices that can be constructed in accordance with this invention. Such tag disabling devices have particular utility for use with RFID tags that are permanently or fixedly secured to the vehicles to selectively disable such tags, yet permit their ready re-enablement. Examples of transponders fixedly secured to the windshield of a vehicle with which the tag disabling devices of this invention may be used are disclosed in U.S. Pat. Nos. 6,121,880 (Scott et al.) and 7,301,462 (Holling et al.); and in U.S. Published Application 20060250250 (Youn), whose disclosures are incorporated by reference herein. An example of a transducer embedded in the glass of a windshield of a vehicle with which the tag disablers of this invention may be used is found in U.S. Pat. No. 6,275,157 (Mayes et al.), whose disclosure is also incorporated by reference herein.

It should be pointed out at this juncture that the RFID transponders of the aforementioned patents/application are not all inclusive. Thus, the tag disabling devices of this invention can also be used with standard RFID tags that are in hard cases.

In the exemplary embodiment shown in FIG. 1, the transponder 22 is in the form of a "sticker" tag, like that disclosed in the heretofore identified Scott et al. patent. In particular, the exemplary tag 22 basically comprises a generally planar, card-like member 22A that is adhesively secured to the windshield 10 of a vehicle. The card 22A includes flexible circuit substrate (not shown) having an antenna (not shown) formed thereon and transponder (RFID) circuitry disposed on the substrate and coupled to the antenna. The antenna exhibits characteristic impedance that is defined in part by a dielectric constant of the flexible circuit substrate in combination with a dielectric constant of the glass surface of the windshield 10 on which it is mounted. As a result, a proper impedance match between the antenna and the transponder circuit is achieved only when the sticker tag is affixed to the glass surface. The RFID circuitry of the sticker tag includes a memory having a read-only portion and a re-writable portion and may be in the form of an electronic chip 22B, e.g., an off the shelf item or an ASIC. Typically the chip portion 22B of the tag 22 projects slightly outward from the back surface of the card 22A when the tag is mounted on the windshield of the vehicle.

The tag disabling device 20 shown in FIG. 1 basically comprises a generally planar member having a body 24 including a metallic portion (to be described later) and means 25 for releasably securing the body to the windshield 10 of the vehicle so that the metallic portion is at an operative position over the tag 22. When the device is in the operative position the metallic portion of the tag disabling device 20 automatically disables (i.e., prevents proper operation of) the transponder 22. This action is accomplished in ways that differ from the techniques of the prior art. In particular, the tag disabling devices of this invention create an RF short of the incident interrogation RF field. This action reduces the electric field to zero at the surface of the tag disabling device. Moreover the tag disabling devices also detune the antenna due to capacitive coupling of the antenna with the tag disabling device. Both of these actions effectively disable proper operation of the tag. However, it should be pointed out that either of these two actions could be used separately to disable the RFID tag. Thus, both are not required. The operation of the tag may also degraded by changing the characteristics of the matching section which matches the antenna impedance to the chip impedance so as to degrade the performance of the tag to the point where it cannot be read.

The tag disabling devices of this invention do not have to fully cover the antenna. For example, a tag disabling device of this invention could work simply by changing the electric field in the vicinity of the antenna matching section, which matches the impedance of the antenna to the impedance of the chip (off the shelf electronic device or ASIC). This change of the field around the matching section would change the matching of the impedance of the antenna to the chip and disable proper tag-reader communications without substantially changing the RF field around the resonant elements of the antenna. This can be accomplished by using a conductor or an RF absorbent material in a relatively small area.

A tag disabling device in accordance with this invention could also be constructed which would not change the impedance of the antenna, but would short the electric field, thus disabling proper communications as well. Alternatively a tag disabling device in accordance with this invention could also be constructed to change the impedance of the antenna, but not short the electric field, thus disabling proper communications. Shorting the interrogating field and detuning the antenna impedance also do not require that the complete tag be covered by the tag disabling device. These methods of using less than full-area coverage of the tag require more precise placement of the tag disabling device, however.

In the exemplary embodiment shown the entire body 24 of the tag disabling device 20 is metallic, e.g., the body 24 is formed of a thin metal, e.g., aluminum (although other metals can be used as well), sheet of generally rectangular shape. Such a configuration is merely exemplary. Thus, the body of any of the tag disabling devices of this invention may be of any suitable shape and may be formed of other materials, e.g., various types and grades of plastic, such as polycarbonate, or static cling vinyl, so long as a portion of the device is metallic or has metal deposited or adhered to one or both sides of the plastic, and that portion is of sufficient extent so that when it is disposed over the antenna of the tag it disables operation of tag so that the tag cannot be read. Moreover, the tag disabling devices of this invention can be made larger than the RFID tags, which enable them to be seen from the outside of the vehicle for enforcement considerations, or they can be made smaller than the RFID tag, as long as certain critical areas of the antenna are covered by the metal of the device. This critical area varies depending on the RFID tag antenna design.

The body 24 of the device 20 has a central ridge forming on its undersurface a channel or recess 26 located between a pair of generally planar body portions 28A and 28B. The recess is provided to accommodate the projecting portion 22B of the tag. The two, planar body portions 28A and 28B are coplanar with each other and their inner surface is arranged to abut or be in very close proximity to the outer (back) surface of the tag 22 when the device is in the operative position (as will be described later). A flange 30A projects upward and outward from the outer marginal edge of the body portion 28A, while a similar flange 30B projects upward and outward from the outer marginal edge of the body portion 28B. Each of the flanges 30A and 30B defines a respective recess on its undersurface. Each recess 30A and 30B is shallow and is arranged to receive a respective one of the releasable securing means 26 for releasably mounting the tag disabling device at its operative position on the windshield, so that the planar portions 28A and 28B are in engagement or very close proximity to the outer surface of the tag 22 and thus are very close to the tag's antenna.

In the exemplary embodiment, the releasably securable means 26 constitutes thin cooperating strips (to be described later) of a hook and loop, e.g., VELCRO®, fastening system. Other releasably securable fasteners, e.g., suction cups, etc., can be disposed in the recesses 30A and 30B in lieu of the hook and loop fasteners to releasably mount the tag disabling device at the operative position on the windshield. The size and shape of the central channel 26 and the two planar body portions 28A and 28B are sufficient so that when the tag disabling device is releasably secured to the windshield over the tag at the operative position enough of the antenna of the tag is covered by the metal to disable the operation of the tag. To that end, in the exemplary embodiment shown the width of the tag disabling device between the two flanges 30A and 30B is just slightly wider than the width of the sticker tag 22. Moreover, the depth of the recess 26 is selected so that it can readily accommodate the portion of the tag 22 that projects outward from the rear surface of the tag, e.g., the ASIC, so that the body portions 30A and 30B can be in very close proximity to the tag's antenna to ensure that proper disabling occurs when desired and to provide relief from direct pressure. It should be clear that the use of a channel to accommodate the projecting portion 22A of the tag is merely exemplary. Thus, other shaped recesses can be provided to accommodate any projecting portion of the tag. If the back surface of the tag is planar the tag disabling device need not include any central recess.

As will be appreciated by those skilled in the art from the foregoing, when the tag disabling device is in place in the operative position over the tag it will be very close to the inner surface of the windshield. In order to facilitate the ability of the user to remove the device when it is no longer required to disable the tag, the device includes four projecting ears or handles 32, 34, 36 and 38. Each handle is in the form of a flange projecting upward and outward from a respective edge of an associated body portion. For example, the handle 32 projects upward and outward from the top edge of the planar body portion 28A, while the handle 34 projects upward and outward from the bottom edge of that body portion. In a similar manner the handle 36 projects upward and outward from the top edge of the planar body portion 28B, while the handle 38 projects upward and outward from the bottom edge of that body portion. The space between the bottom (inner) surface of each of the body portions 28A and 28B and the underside of each of the device's handles enables the user of the device to readily grasp the handles to effect the easy removal of the device from the windshield when so desired.

Figure 3:
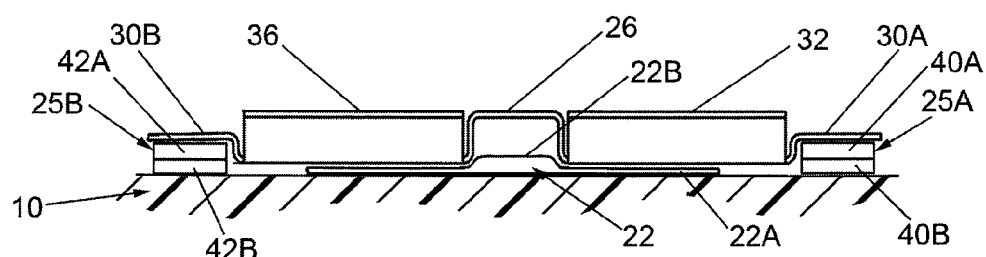
FIG. 3 is a side elevation view taken along line 3-3 of FIG. 2.
Figure 4:
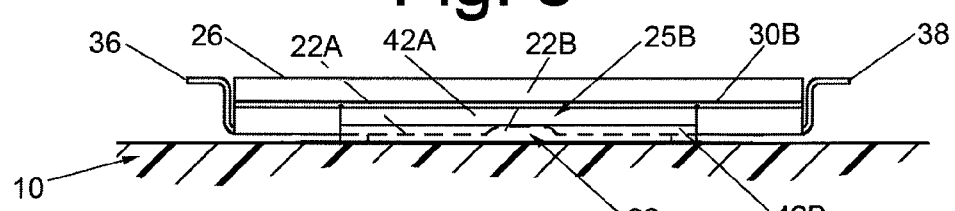
FIG. 4 is a side elevation view taken along line 4-4 of FIG. 2.

The details of the exemplary hook and loop fastening means 25 will now be described with particular reference to FIGS. 1 and 2-4. Thus, as can be seen the tag disabling device 20 includes two pairs 25A and 25B of cooperating VELCRO® strips. In particular, the strip 25A basically comprises an elongated strip 40A having the plural hook like elements and an elongated strip 42A having plural loops. The strip 40A is fixedly secured, e.g., adhesively secured, to the undersurface of the flange forming the recess 30A. The strip 42A is initially releasably secured by its loops to the hook like elements of the strip 40A, but is arranged to be fixedly secured to the windshield of the vehicle closely adjacent one lateral side of the tag 22 and to be left in place in that location after having been initially placed thereat. To that end, the outer surface of the strip 42A includes an adhesive (not shown) thereon. The adhesive is initially protected by a removable cover or liner sheet (not shown). In a similar manner, the strip 25B basically comprises an elongated strip 40B having the plural hook like elements and an elongated strip 42B having plural loops. The strip 40B is fixedly secured, e.g., adhesively secured, to the undersurface of the flange forming the recess 30B. The strip 42B is initially releasably secured by its loops to the hook like elements of the strip 40B, but is arranged to be fixedly secured to the windshield of the vehicle closely adjacent the opposite lateral side of the tag 22 and to be left in place in that location after having been initially placed there. To that end, the outer surface of the strip 42B includes an adhesive (not shown) thereon which is also initially protected by a removable cover or liner strip (not shown). The VELCRO® strips making up pairs 25A and 25B are located on the undersurface of the flanges 30A and 30B between respective pairs of indicia lines 44 provided on the undersurface of those flanges.

It should be pointed out at this juncture that the strips 40A and 42A may be the loop components of the VELCRO® system and the strips 40B and 42B be the hook elements of that system, if desired. Moreover, as mentioned above, other releasably securable means can be utilized to releasably secure the tag disabling devices of this invention in place in the operative position with respect to the RFID antenna of the transponder. Such means can comprise the heretofore mentioned suction cups, but can also comprise a static cling material(s).

As also mentioned above the tag disabling devices of this invention can be made larger than the RFID tags or they can be made smaller than the RFID tag, as long as certain critical areas of the antenna are covered by the metal of the devices. The exemplary embodiment 20 shown in FIG. 1 is larger than the tag 22 and has the following dimensions (such dimensions being exemplary of many sizes and shapes the devices may take). The device's overall width is 4.3 inches (10.9 cm). Its overall height is 3.94 inches (10 cm). The width of the channel 26 is 0.56 inch (14.2 mm). The maximum thickness (i.e., the distance between the outer surface of the portions 28A and 28B which engage or are immediately adjacent the outer surface of the tag's card 22A when the device is in the operative position and the top of the ridge forming the recess 26) is 0.26 inch (6.6 mm). The depth of the recesses formed by the undersurfaces of the flanges 30A and 30B in which the VEL- CRO® strips 25A and 25B are located is 0.12 inch (3 mm). The length of each of the flanges 30A and 30B is 3.38 inches (8.6 cm). The width of each of the handles 32, 24, 36 and 28 is 1.32 inches (3.3 cm).

The initial installation and use of the tag disabling device will now be described. To that end, the tag disabling device 20 is initially provided to a user with the two pairs of cooperating VELCRO® hook and loop strips 25A and 25B secured to the underside of flanges 30A and 30B, respectively. The device is designed so that the VELCRO® strips 40B and 42B are deposited and fixedly secured to the inner surface of the windshield on respective sides of the sticker tag (or on any other surface of the vehicle on which the transponder is affixed if it is not affixed to the inner surface of the windshield). Thus, once those strips are secured in that position they will remain resident there. The cooperating VELCRO® strips 40A and 42A remain fixedly secured to the undersurface of the flanges 30A and 30B, respectively. In order to facilitate proper affixation of the strips 40B and 42B to the windshield, it may be desirable to clean the windshield's inner surface immediately to the left and right of the sticker tag. This may be accomplished through the use of an alcohol wipe or any other suitable cleaner. Once those areas of the windshield are clean all the user has to do is to remove the peel-off cover or liner strips (not shown) that are initially provided to protect the adhesive surfaces of the VELCRO® strips 40B and 42B. The user then positions the tag disabling device 20 as shown in FIG. 1 so that it is juxtaposed over the sticker tag 22 with the raised ridge (channel 26) in the middle of the device fitting directly over the projection 22B of the tag. This action causes the VELCRO® strips 40B and 42B to become secured to the windshield immediately adjacent the two lateral sides of the tag. When viewed through the vehicle's windshield, the windshield sticker tag is visible underneath the tag disabling device. To further expedite ensure proper securement of the VELCRO® strips 40B and 42B to the windshield it is advisable to leave the tag disabling device in place on the windshield for a sufficient time for the adhesive to cure, e.g., at least 24 hours. Once the adhesive has cured the tag disabling device 20 can be removed (assuming that it is not needed at the time to disable the sticker tag).

To remove the device 20 all one has to do is to grip it by its upper and lower handles and pull it away from the windshield. The strips 40B and 42B will remain on the windshield ready to receive respective ones of the strips 40A and 42A that remain affixed to the tag disabling device when the tag disabling device is reapplied to the tag to disable it at some later time.

Use of the device is as follows. For example, if the user of the vehicle does not want his/her account billed for a toll when the vehicle is used on a roadway forming a portion of an electronic toll collection system, such as when the user has the required number of occupants in his/her vehicle to use a HOV/HOT lane, all the user has to do is apply the tag disabling device in a similar manner as it was initially applied to the windshield. By so doing its VELCRO® strips 40A and 42A that are affixed to the undersurface of the flanges 30A and 30B will engage the VELCRO® strips 40B and 42B, respectively, that are permanently secured to the windshield on opposite sides of the tag. This releasably secures the tag disabling device in the operative position with respect to the tag 22, thereby disabling the tag's operation.

When, the disabling device is not desired to be used, e.g., if the vehicle does not contain the required number of occupants to use the HOV/HOT lane, or if the user of the vehicle wishes to pay the tolls manually, the user merely removes the tag disabling device as described above. Once removed, the tag disabling device is preferably stored in the vehicle's glove box or console compartment to be ready for use when required again.

In FIGS. 5 and 6 there is shown another embodiment 20' of a tag disabling device constructed in accordance with this invention. The device 20' is very similar in construction to the device 20, except that it doesn't include the handles 32, 34, 36, and 38 to facilitate removal of the device. In the interest of brevity the details of the construction, use and operation of the device 20' will not be reiterated. Moreover, the components of the devices 20' that are the same as those of the device 20 are given the same reference numbers. Use of the tag disabling device 20' is the same as that of the tag disabling device 20, except that for removal the user will have to grasp whatever portions of the device 20' are accessible to accomplish that end.

As should be appreciated from the foregoing the tag disabling the devices of the subject invention have various applications. For example, when more than one RFID tag is mounted on or in a vehicle windshield, and it is desired to read or write to one tag while preventing any interference from the other, the tag disabling device can be used to disable the tag which is not to be read. This can occur during RFID system testing, or on actual vehicles that travel interstate highways and are forced to use different tags for various toll roads along the way. Another application is a toll road with high occupancy toll (HOT/HOV) lanes. There may be times where it would be desirable to temporarily disable an RFID tag, such as a windshield sticker tag, such that no toll is paid when traveling through a toll plaza. A person driving in the HOT/HOV lane that had someone else or others in the vehicle with them would be allowed by the toll authority to travel on the toll road without paying tolls. If a person was alone and wanted to drive in the HOT/HOV lane, they too would be allowed, but would have to pay tolls, and therefore would not be allowed to use the tag disabling device. Still another application is to be able to temporarily disable a permanently fixed RFID tag mounted on the windshield of a vehicle so that an alternative tag could be used and the toll charges billed to an alternative account. For example a driver using a personal car with a personal tag could temporarily disable the personal tag and have the tolls for business purposes billed on a business account with an alternative tag. Yet another application is to temporarily disable a permanently fixed RFID tag and pay toll with a coupon, token or cash. This list of applications for the subject invention is not exhaustive and other uses for temporarily disabling a permanently installed RFID tag are within the scope of this invention. Similar uses include applications in vehicular access control, traffic monitoring, parking, and the like.

While the invention has been described in detail and with reference to specific embodiments thereof, it will be apparent to one skilled in the art that various changes and modifications can be made therein without departing from the spirit and scope thereof.

What is claimed is:

1. A device for disabling an RFID transponder secured to the windshield of a vehicle so that the transponder can be selectively manually disabled and enabled, the transponder comprising an antenna and RFID circuitry coupled to the antenna, said disabling device comprising a conductive portion and a handle coupled to said conductive portion, said conductive portion being arranged to be manually coupled to said transponder in an operative position, whereupon said conductive portion is disposed immediately adjacent the antenna and capacitively coupled to the antenna to short out the antenna and thereby disable said RFID circuitry, said handle being arranged to be grasped to manually remove said conductive portion of said disabling device from said operative position, whereupon the RFID circuitry is automatically enabled.

2. The device of claim 1 wherein said conductive portion comprises a metallic portion.

3. The device of claim 1 wherein said conductive portion is also arranged to alter the impedance of the antenna.

4. The device of claim 3 wherein the transponder additionally comprises an antenna matching section and wherein said conductive portion is arranged so that when it is in said operative position it is located adjacent the antenna matching section to alter the impedance of the antenna.

5. The device of claim 1 wherein said device is arranged to be releasably secured to the transponder.

6. A system for manually enabling and disabling an RFID transponder secured to the windshield of a vehicle so that said transponder can be selectively manually disabled and enabled, said system comprising said transponder and a disabling device, said transponder comprising an antenna and RFID circuitry coupled to said antenna, said disabling device comprising a conductive portion and a handle coupled to said conductive portion, said conductive portion being arranged to be manually coupled to said transponder in an operative position, whereupon said conductive portion is disposed immediately adjacent said antenna and capacitively coupled to said antenna to short out said antenna and thereby disable said RFID circuitry, said handle being arranged to be grasped to manually remove said conductive portion of said disabling device from said operative position, whereupon said RFID circuitry is automatically enabled.

7. The system of claim 6 wherein said conductive portion comprises a metallic portion.

8. The system of claim 6 wherein said conductive portion is also arranged to alter the impedance of said antenna.

9. The system of claim 8 wherein the transponder additionally comprises an antenna matching section and wherein said conductive portion is arranged to be located adjacent the antenna matching section to alter the impedance of said antenna.

10. The system of claim 6 wherein said disabling device is arranged to be releasably secured to said transponder.

11. A method of selectively disabling a RFID transponder secured to the windshield of a vehicle and which is used in an electronic toll system or some other electronic system wherein a vehicle with an RFID transponder is to be interrogated by a reader to determine the vehicle's presence at a certain location, the transponder being arranged to provide a first electrical signal when queried by a transmitter forming a portion of the electronic system and comprising an antenna and RFID circuitry, said method comprising:
providing the user of the system with a disabling device, said disabling device comprising a conductive portion and a handle coupled to said conductive portion;
manually coupling said conductive portion of said disabling device to said transponder in an operative position, whereupon said conductive portion is disposed immediately adjacent the antenna and capacitively coupled to the antenna to short out the antenna and thereby disable said RFID circuitry; and
utilizing said handle, when desired, to remove said disabling device from said operative position, whereupon the RFID circuitry is automatically enabled.

12. The method of claim 11 wherein the electronic system is an electronic toll system which is used on a roadway that includes a high occupancy vehicle or high occupancy toll (HOV or HOT, respectively) lane and wherein said method comprises:
disabling the transponder by coupling said conductive portion of said disabling device at said operative position when the vehicle is utilized in the HOV/HOT lane with at least the minimum number of occupants to meet the HOV/HOT requirements of the entity operating the electronic toll system, so that the account associated with the transponder will not be charged.

13. The method of claim 12 wherein said method comprises:
enabling the transponder by removing said conductive portion of said disabling device from said operative position when the vehicle is utilized with less than the minimum number of occupants to meet the HOV/HOT requirements of the entity operating the electronic toll system, so that the account associated with the transponder will be charged when the transponder is queried by the transmitter of the system.

14. The method of claim 11 wherein the vehicle includes plural RFID transponders and wherein said method comprises:
disabling a selected one of said transponders by coupling said conductive portion of said disabling device at said operative position when it is desired to disable that transponder so that the account associated with the disabled transponder will not be charged.

15. The method of claim 11 wherein said method comprises manually releasably securing said disabling device to said transponder.

16. A device for disabling an RFID transponder secured to the windshield of a vehicle so that the transponder can be selectively manually disabled and enabled, the transponder comprising an antenna and RFID circuitry coupled to the antenna, said disabling device comprising a conductive portion, a handle coupled to said conductive portion and an indicating portion for indicating the operative status of said disabling device, said conductive portion being arranged to be manually coupled to said transponder in an operative position, whereupon said conductive portion is disposed immediately adjacent the antenna and capacitively coupled to the antenna to short out the antenna and thereby disable said RFID circuitry, said handle being arranged to be grasped to manually remove said conductive portion of said disabling device from said operative position, whereupon the RFID circuitry is automatically enabled, said indicating portion being visible through the windshield to provide a visual indication of whether the transponder is disabled or enabled.

17. The device of claim 16 wherein said conductive portion is arranged to be disposed immediately adjacent the antenna and coupled to the antenna to alter the impedance of the antenna to shift its resonance frequency and/or to reduce the electric field at the antenna to thereby disable the RFID circuitry when said conductive portion is in said operative position.

18. The device of claim 16 wherein said device is arranged to be releasably secured to the transponder.

19. A system for manually enabling and disabling an RFID transponder secured to the windshield of a vehicle so that said transponder can be selectively manually disabled and enabled, said system comprising said transponder and a disabling device, said transponder comprising an antenna and RFID circuitry coupled to the antenna, said disabling device comprising a conductive portion, a handle coupled to said conductive portion, and an indicating portion for indicating the operative status of said disabling device, said conductive portion being arranged to be manually coupled to said transponder in an operative position, whereupon said conductive portion is disposed immediately adjacent the antenna and capacitively coupled to the antenna to short out the antenna and thereby disable said RFID circuitry, said handle being arranged to be grasped to manually remove said conductive portion of said disabling device from said operative position, whereupon said RFID circuitry is automatically enabled, said indicating portion being visible through the windshield to provide a visual indication of whether the transponder is disabled or enabled.

20. The system of claim 19 wherein said conductive portion is arranged to be disposed immediately adjacent the antenna and coupled to the antenna to alter the impedance of the antenna to shift its resonance frequency and/or to reduce the electric field at the antenna to thereby disable the RFID circuitry when said conductive portion is in said operative position.

21. The system of claim 19 wherein said device is arranged to be releasably secured to the transponder.

22. A method of selectively disabling a RFID transponder secured to the windshield of a vehicle and which is used in an electronic toll system or some other electronic system wherein a vehicle with an RFID transponder is to be interrogated by a reader to determine the vehicle's presence at a certain location, the transponder being arranged to provide a first electrical signal when queried by a transmitter forming a portion of the electronic system and comprising an antenna and RFID circuitry, said method comprising:

providing the user of the system with a disabling device, said disabling device comprising a conductive portion, a handle coupled to said conductive portion and an indicating portion for indicating the operative status of said disabling device;

manually coupling said conductive portion of said disabling device to said transponder in an operative position, whereupon said conductive portion is disposed immediately adjacent the antenna and capacitively coupled to the antenna to short out the antenna and thereby disable said RFID circuitry;

utilizing said handle, when desired, to remove said disabling device from said operative position, whereupon the RFID circuitry is automatically enabled; and observing the disabling device through the windshield to determine whether the transponder is disabled or enabled.

* * * * *